(12) United States Patent
Berkey et al.

(10) Patent No.: US 7,194,172 B2
(45) Date of Patent: Mar. 20, 2007

(54) SINGLE POLARIZATION OPTICAL FIBER AND SYSTEM AND METHOD FOR PRODUCING SAME

(75) Inventors: George E. Berkey, Pine City, NY (US); Xin Chen, Corning, NY (US); Ming-Jun Li, Horseheads, NY (US); Daniel A. Nolan, Corning, NY (US); William A. Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 329 days.

(21) Appl. No.: 10/864,732

(22) Filed: Jun. 9, 2004

(65) Prior Publication Data

US 2004/0258379 A1 Dec. 23, 2004

Related U.S. Application Data

(60) Provisional application No. 60/479,892, filed on Jun. 19, 2003.

(51) Int. Cl.
*G02B 6/02* (2006.01)
*G02B 6/36* (2006.01)
(52) U.S. Cl. .................. 385/127; 385/123; 385/126
(58) Field of Classification Search .......... 385/123–128
See application file for complete search history.

(56) References Cited

U.S. PATENT DOCUMENTS

| | | | |
|---|---|---|---|
| 4,184,859 A | 1/1980 | Maklad | 65/2 |
| 4,274,854 A | 6/1981 | Pleibel et al. | 65/2 |
| 4,307,938 A | 12/1981 | Dyott | 350/96.3 |
| 4,478,489 A | 10/1984 | Blankenship et al. | 350/96.3 |
| 5,032,001 A * | 7/1991 | Shang | 385/124 |
| 5,841,131 A | 11/1998 | Schroeder et al. | 250/227.17 |
| 2004/0258377 A1 | 12/2004 | Berkey et al. | 385/123 |

FOREIGN PATENT DOCUMENTS

| | | |
|---|---|---|
| EP | 0 447 075 | 1/1991 |
| EP | 1 148 360 | 2/2001 |

(Continued)

OTHER PUBLICATIONS

Patent Abstracts of Japan, vol. 010, No. 345 (C-386), Nov. 20, 1986, Publication No. 61-146725, Sumitomo Electric Ind. Ltd., Jul. 4, 1986, "*Production of Side Tunnel Shape Constant Polarization Fiber*", abstract, figures 1a-1d.

(Continued)

*Primary Examiner*—Frank G. Font
*Assistant Examiner*—Michael P. Mooney
(74) *Attorney, Agent, or Firm*—Svetlana Z. Short

(57) ABSTRACT

An optical fiber that includes a central core having a maximum dimension (A) greater than a minimum dimension (B), preferably with an aspect ratio greater than 1.5, the fiber having at least one air hole positioned on opposite sides of the central core and extending along the fiber's length wherein the fiber supports a single polarization mode within an operating wavelength band. The fiber may be coupled to optical components in systems to provide single polarization in the band. A method for manufacturing the fiber is also provided.

11 Claims, 9 Drawing Sheets

FOREIGN PATENT DOCUMENTS

| JP | 59-050043 |   | 3/1984 |
|----|-----------|---|--------|
| JP | 5905004   | * | 3/1984 |
| JP | 61-146725 |   | 7/1986 |

OTHER PUBLICATIONS

Patent Abstracts of Japan, vol. 008, No. 138 (C-231), Jun. 27, 1984, Publication No. 59-050043, Sumitomo Denki Kogyo KK, Mar. 22, 1984, "*Production of Constant Polarization Fiber*", abstract, figures 1-6.

Kazuaki Yoshida, et al., "*Fabrication and Characterization of Side-Hole Single-Mode Optical Fibers*", Optical Fiber Technology 2, 1996, Article No. 0035, pp. 285-290.

Jan Wójcik, et al., "*Prototype of the side-hole HB optical fiber*", SPIE vol. 3731, 1999, pp. 88-93.

J. R. Simpson, et al., "*A Single-Polarization Fiber*", Journal of Lightwave Technology, vol. LT-1, No. 2, Jun. 1983, pp. 370-374.

Toshio Hosono, et al., "*Polarization-Maintaining Optical Fibers with Hollow Circular Pits*", Journal of Lightwave Technology, vol. LT-4, No. 11, Nov. 1986, pp. 1609-1616.

Hiroshi Suganuma, et al., "*Characteristics of Side-Tunnel Single-Polarization Optical Fiber*", IOOC—ECOC, 1985, pp. 139-142.

Takashi Hinata, et al., "*A Single-Polarization Optical Fiber of Hollow Pit Type with Zero Total Dispersion at Wavelength of 1.55 μm*", Journal of Lightwave Technology, vol. 12, No. 11, Nov. 1994, pp. 1921-1925.

Michael J. Messerly, et al., "*A Broad-Band Single Polarization Optical Fiber*", Journal of Lightwave Technology, vol. 9, No. 7, Jul. 1991, pp. 817-820.

* cited by examiner

US 7,194,172 B2

SINGLE POLARIZATION OPTICAL FIBER AND SYSTEM AND METHOD FOR PRODUCING SAME

CROSS-REFERENCE TO RELATED APPLICATIONS

This application claims the benefit of priority under 35 U.S.C. § 119(e) of U.S. Provisional Application Ser. No. 60/479,892 filed on Jun. 19, 2003.

BACKGROUND OF THE INVENTION

1. Field of the Invention

The present invention relates generally to optical fiber, and more particularly to a single polarization optical fiber.

2. Technical Background

Single polarization optical fibers are useful for ultra-high speed transmission systems or for use as a coupler fiber for use with and connection to optical components (lasers, EDFAs, optical instruments, interferometric sensors, gyroscopes, etc.). The polarization characteristic (single polarization) propagates one, and only one, of two orthogonally polarized polarizations while suppressing the other polarization by increasing its transmission loss. Such single polarization fibers generally have an azimuthal asymmetry of the refractive index profile.

One type of prior polarization retaining fiber includes, as shown in FIG. 1, a central core 10 surrounded by an inner cladding region 11. Core 10 and cladding region 11 are formed of conventional materials employed in the formation of optical waveguides. The refractive index of the core material must be greater than that of the cladding material and that both materials must exhibit low losses at the wavelength at which the waveguide is intended to be operated. By way of example only, core 10 may consist of silica containing one or more dopants which increase the refractive index thereof, such as germania. Region 11 may comprise pure silica, silica containing a lesser amount of dopant than core 10, or silica containing one or more down dopants, at least one of which is an oxide of an element such as boron or fluorine which lowers the refractive index of silica.

In FIG. 1, diametrically opposed relative to core 10, are two regions 12 formed of a glass material having a Coefficient of Thermal Expansion (TCE) different from that of cladding material 11. When such a fiber is drawn, the longitudinally-extending regions 12 and the cladding regions disposed orthogonally thereto will shrink different amounts whereby regions 12 will be put into a state of tension or compression depending upon the TCE thereof relative to that of the cladding 11. A strain induced birefringence, which is thus induced in the fiber, reduces coupling between the two orthogonally polarized fundamental modes. Surrounding regions 12 is an outer cladding region 13, the refractive index of which is preferably equal to or less than that of inner cladding region 11. Region 13 may consist, for example, of any of the materials specified above for use as cladding region 11.

Slight improvement in the polarization performance of single mode optical waveguides has been achieved by elongating or distorting the fiber core symmetry as a means of decoupling the differently polarized waves. Examples of such optical fiber waveguides with elongated cores are disclosed in U.S. Pat. Nos. 4,184,859, 4,274,854, and 4,307,938. FIG. 2 herein illustrates a waveguide 1 having a core 4 having refractive index n1, a cladding 5 having a refractive index n2, wherein the elongated core 4 has a major axis a and a minor axis b. However, the noncircular geometry and the associated stress-induced birefringence alone are, generally, not sufficient to maintain the desired single polarization.

It has, therefore, been an area of ongoing development to obtain a fiber providing single polarization.

SUMMARY OF THE INVENTION

Definitions:

The following definitions and terminology are commonly used in the art.

Refractive index profile—the refractive index profile is the relationship between the refractive index ($\Delta$ %) and the optical fiber radius (as measured from the centerline of the optical fiber) over a selected segment of the fiber.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent $\Delta$ %—the term $\Delta$ % represents a relative measure of refractive index defined by the equation:

$$\Delta\% = 100 \times (n_i^2 - n_c^2)/2n_i^2$$

where $\Delta$ % is the maximum refractive index of the index profile segment denoted as i, and $n_c$, the reference refractive index, is taken to be the refractive index of the cladding layer. Every point in the segment has an associated relative index measured relative to the cladding.

Alpha-profile—the term alpha-profile refers to a refractive index profile of the core expressed in terms of $\Delta(b)$ % where b is the radius, and which follows the equation:

$$\Delta(b)\% = [\Delta(b_0)(1 - [\alpha b_0 \alpha/(b_1 - b_0)^\alpha] \times 100,$$

where $b_0$ is the maximum point of the profile of the core and $b_1$ is the point at which $\Delta(b)$ % is zero and b is the range of $b_i$ is the range of $b_i$ less than or equal to b less than or equal to $b_f$, where $\Delta$ % is defined above, $b_i$ is the initial point of the alpha-profile, $b_f$ is the final point of the alpha-profile, and alpha is an exponent which is a real number. The initial and final points of the alpha profile are selected and enter into the computer model. As used herein, if an alpha-profile is preceded by a step index profile, the beginning point of the $\alpha$-profile is the intersection of the $\alpha$-profile and the step profile. In the model, in order to bring out a smooth joining of the $\alpha$-profile with the profile of the adjacent profile segment, the equation is written as:

$$\Delta(b)\% = [\Delta(b_\alpha) + [\Delta(b_0) - \Delta(b_\alpha)]\{1 - [\alpha b - b_0 \alpha/(b_1 - b_0)]^\alpha\}]100,$$

where $b_\alpha$ is the first point of the adjacent segment.

In accordance with embodiments of the present invention, an optical fiber is provided with a central core having a maximum dimension (A) greater than a minimum dimension (B) and a substantially elliptical shape, the fiber having at least one air hole positioned on each opposite side of the central core wherein the optical fiber supports a single polarization mode within an operating wavelength range. In one embodiment, the central core includes germania-doped silica and is surrounded by an annular region of fluorine-doped silica wherein a first aspect ratio, defined as A/B, is between about 1.5 to 8. In all embodiments herein, the first aspect ratio, defined as A/B, is preferably greater than 1.5, and more preferably between 1.5 and 8.

Preferably, the air holes are positioned such that a line passing through the center of the holes is substantially aligned with the minimum dimension (B). Single polarization optical fibers made in accordance with the invention described herein exhibit an extinction ratio in the wavelength band of single polarization operation of greater than 15. Fiber attenuation is preferably less than 0.030 dB/m at 978 nm. The single polarization fiber in accordance with the invention finds excellent utility in a system including an optical component optically coupled to the single polarization fiber.

In accordance with further embodiments of the invention, the central core preferably has a central core delta %, $\Delta 1$, of between about 0.5% and 2.5%. Furthermore, the fiber preferably includes a fluorine-doped region surrounding the central core having a delta %, $\Delta 2$, of between about −0.0% and −0.75%.

In accordance with another embodiment of the invention, a method of manufacturing an optical fiber, such as the single polarization fiber described above, is provided comprising the steps of: providing a preform having a central core and at least two holes therein, and drawing a fiber or core cane from the preform while applying a positive pressure to the holes thereby causing the central core in the fiber or core cane to take on an elongated shape. Preferably the elongated shape is substantially elliptical and has an aspect ratio, defined as a maximum dimension divided by a minimum dimension, of between about 1.5 and 8.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

For purposes of the description herein, it is to be understood that the invention may assume various alternative configurations and step sequences, except where expressly specified to the contrary. It is also to be understood that the specific fibers and process steps illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

A first embodiment of the single polarization optical waveguide fiber 20 in accordance with the invention described and disclosed herein has a cross-sectional structure, as best shown in FIGS. 3–6. In the illustrated embodiment, the optical waveguide fiber 20 includes a center core 34 extending along the longitudinal axis of the fiber and having a maximum dimension, A, and a minimum dimension, B. The cross-sectional shape of the center core 34 is elongated, and is preferably generally elliptical. Preferably, the elongation would be controlled during fiber processing (draw or redraw) such that the drawn fiber 20 exhibits a first aspect ratio, AR1, defined as A/B, of greater than 1.5; preferably between about 1.5 and 8; more preferably between 2 and 5.

Figure 1:
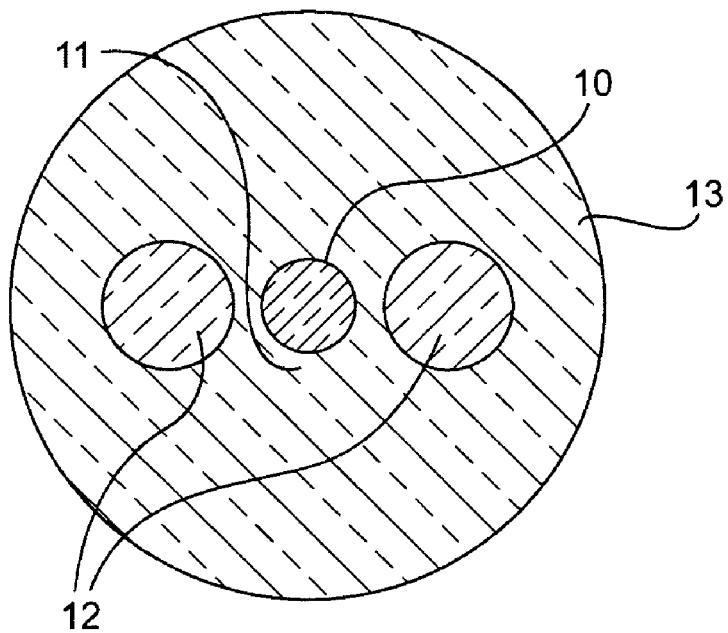
FIG. 1 is a cross-sectional view of an optical waveguide of the prior art.
Figure 2:
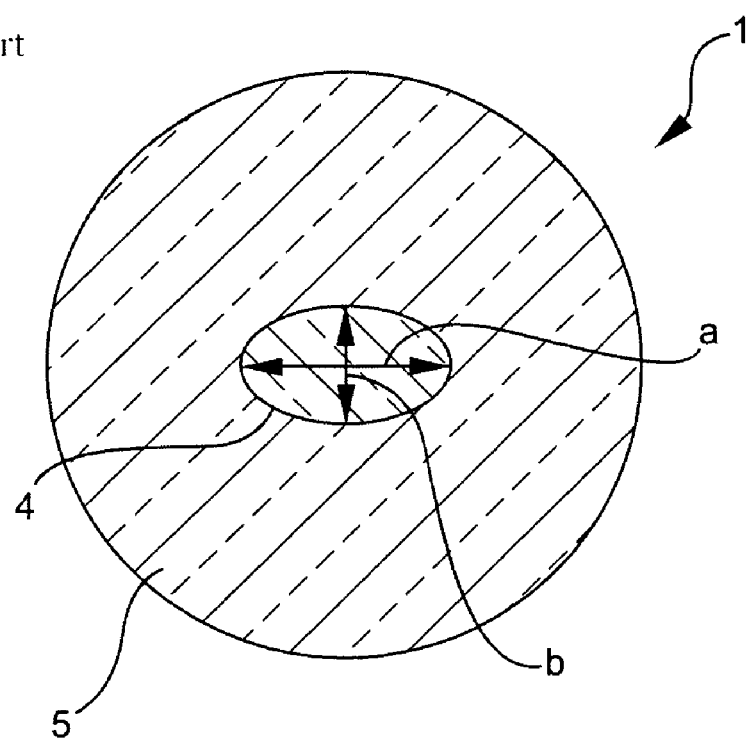
FIG. 2 is a cross-sectional view of another optical waveguide of the prior art.
Figure 3:
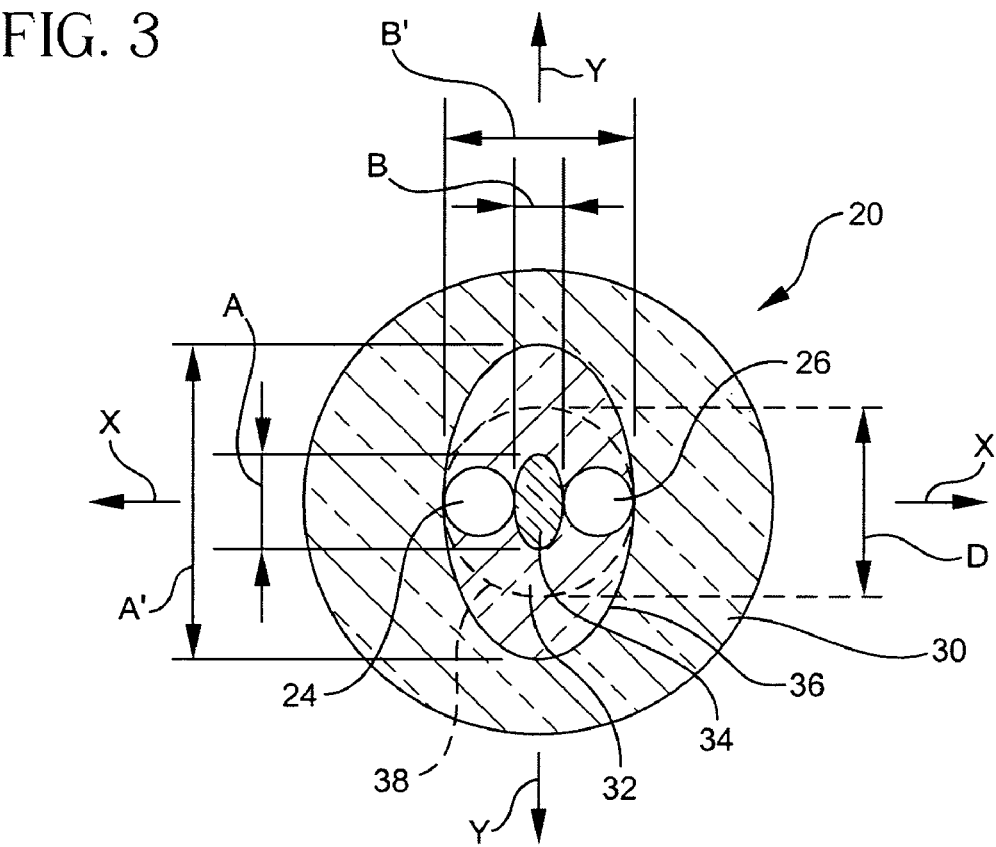
FIG. 3 is a cross-sectional view of a first embodiment of the single polarization optical fiber in accordance with the present invention.
Figure 4:
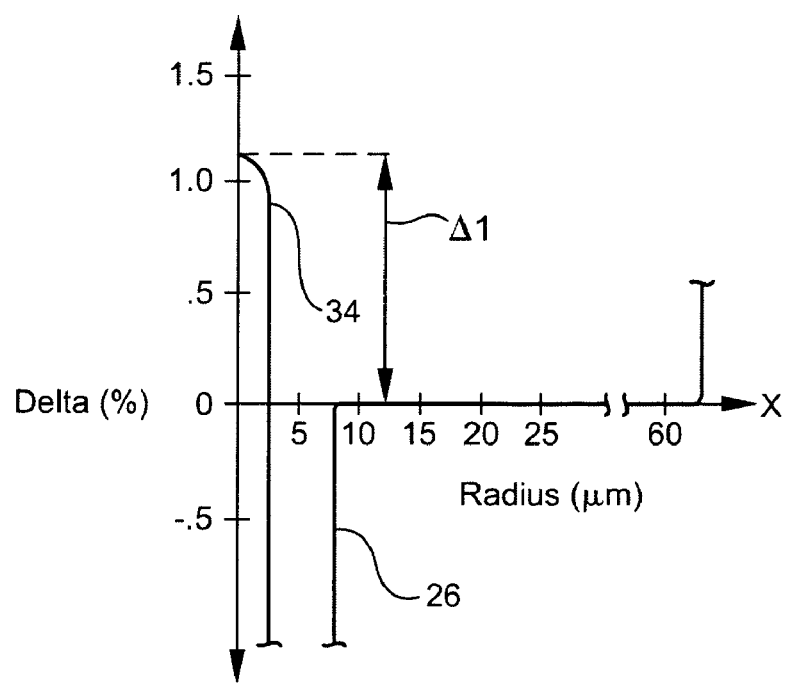
FIG. 4 is a diagram of the refractive index profile of the first embodiment taken along the axis X—X of FIG. 3.
Figure 5:
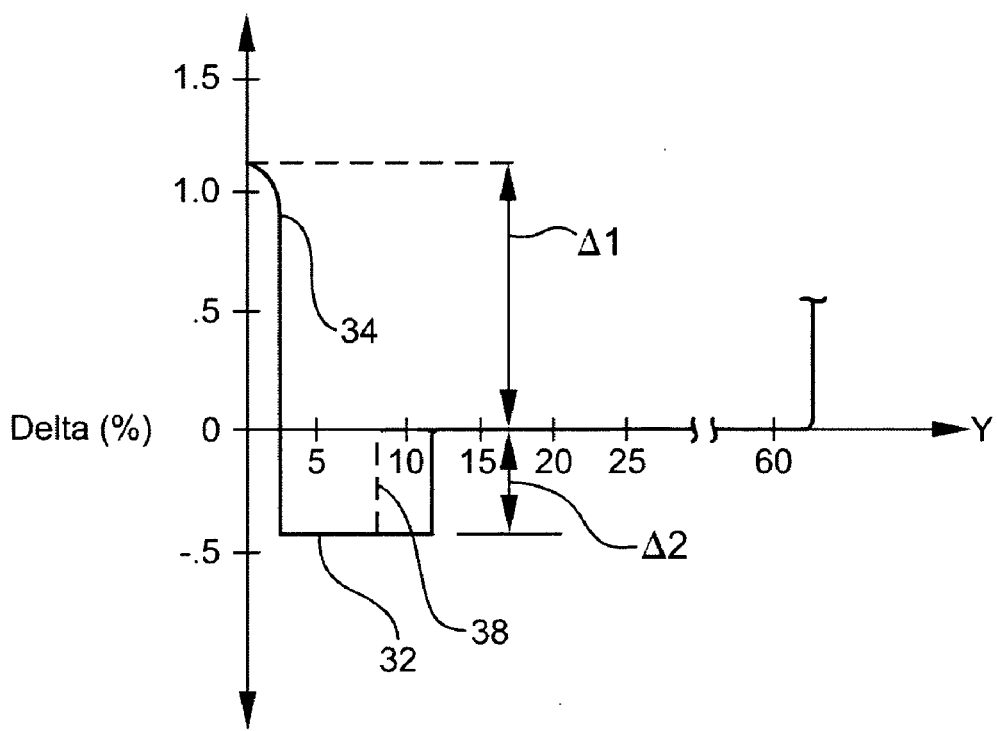
FIG. 5 is a diagram of the refractive index profile of the first embodiment taken along the axis Y—Y of FIG. 3.
Figure 6:
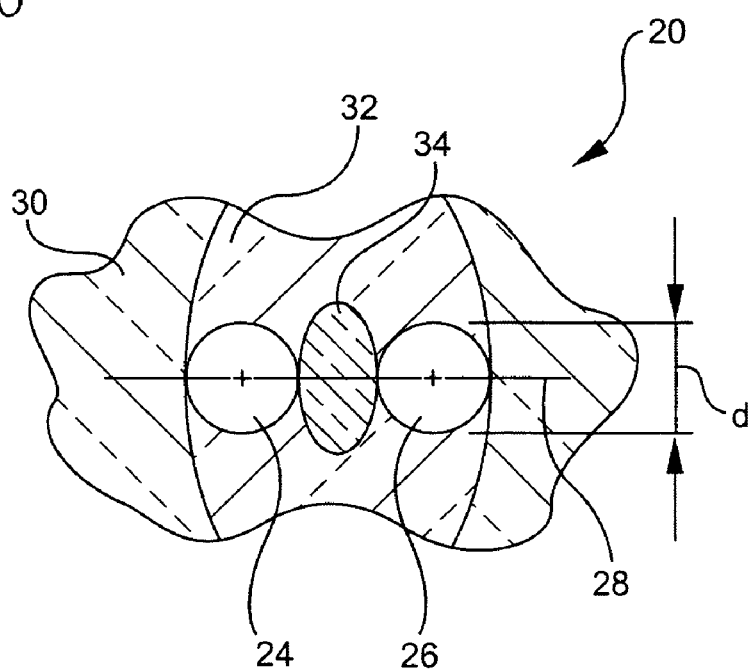
FIG. 6 is an enlarged partial cross-sectional view of the first embodiment of the single polarization optical fiber in accordance with the present invention.

Central core 34 is preferably manufactured from germania-doped silica, wherein germania is provided in a sufficient amount such that the core exhibits a core delta %, $\Delta 1$, as shown in FIGS. 4 and 5, of between about 0.5% and 2.5%; more preferably between about 0.9% and 1.3%; and in one embodiment about 1.1%. An average diameter, $d\ avg = \{A+B\}/2$, of the center core 34 is preferably between about 3 and 12 microns; more preferably between 4 and 10 microns.

Figure 9:
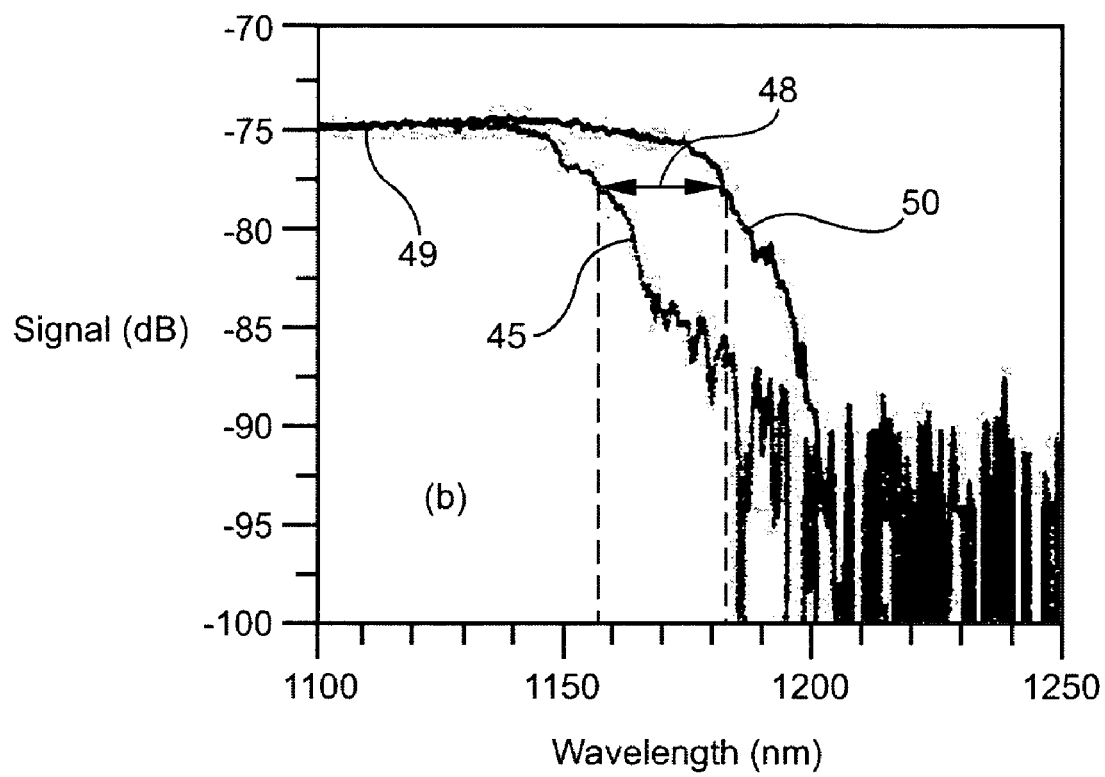
FIG. 9 is a plot illustrating a representative wavelength band of single polarization of an embodiment of the single polarization optical fiber in accordance with the invention.

It has been discovered that by raising the core deltas %, 1, the single polarization bandwidth 48 (See FIG. 9) can be shifted to longer wavelengths. Conversely, making the diameter of the holes 24, 26 smaller can be used to lower the single polarization bandwidth 48 to shorter wavelengths. The single polarization bandwidth 48 is located between the cutoff wavelength of the first polarization 45 and the cutoff wavelength of the second polarization 50. Within this wavelength band 48, true single polarization, that is, there is one, and only one, polarization provided. The single polarization bandwidth 48 is measured herein 3 dB down from the linear region 49 of the plot as best illustrated in FIG. 9.

In this embodiment, the single polarization bandwidth (SPB) 48 extends between about 1,157 nm and 1,182 nm thereby providing a bandwidth of single polarization of about 25 nm. However, it should be recognized that this range is exemplary and that other wavelength bands for the fiber may be provided. The width of the single polarization region (SPB) may be increased by increasing the core delta and reducing the average core diameter. Likewise, the position of the SPB may be adjusted as described above. Further adjustments may be made to the single polarization fiber to adjust the relative position or width of the SPB 48 (See Table 1 below).

Table 1 below illustrates, based upon modeled calculations, the sensitivity of the cutoff wavelength, λ1, of the first polarization, cutoff wavelength, λ2, of the second polarization, and single polarization wavelength band width, Δλ, of the single polarization fiber in accordance with the invention to various changes in hole diameter (d); changes in core delta %, Δ1; changes first aspect ratio, AR1; and changes in the d avg of the central core 34.

TABLE 1

Sensitivity Modeling

| Example # | d (μm) | Δ1 (%) | AR1 | d avg (μm) | λ1 (nm) | λ2 (nm) | Δλ (nm) |
|---|---|---|---|---|---|---|---|
| 1 | 1 | 1.0 | 1.5 | 4 | 1608 | 1577 | 31 |
| 2 | 5 | 1.0 | 1.5 | 4 | 1436 | 1378 | 58 |
| 3 | 10 | 1.0 | 1.5 | 4 | 1358 | 1298 | 59 |
| 4 | 15 | 1.0 | 1.5 | 4 | 1328 | 1267 | 61 |
| 5 | 5 | 1.0 | 3 | 5.6 | 1462 | 1407 | 55 |
| 6 | 10 | 1.0 | 3 | 5.6 | 1344 | 1278 | 66 |
| 7 | 15 | 1.0 | 3 | 5.6 | 1316 | 1246 | 69 |
| 8 | 5 | 1.0 | 5 | 7.2 | 1262 | 1210 | 52 |
| 9 | 10 | 1.0 | 5 | 7.2 | 1162 | 1103 | 59 |
| 10 | 15 | 1.0 | 5 | 7.2 | 1119 | 1057 | 62 |
| 11 | 5 | 1.0 | 8 | 10.8 | 1265 | 1208 | 57 |
| 12 | 10 | 1.0 | 8 | 10.8 | 1127 | 1064 | 63 |
| 13 | 15 | 1.0 | 8 | 10.8 | 1122 | 1057 | 65 |
| 14 | 5 | 0.5 | 3 | 8.15 | 1582 | 1549 | 33 |
| 15 | 5 | 1.0 | 3 | 6 | 1597 | 1541 | 56 |
| 16 | 5 | 1.5 | 3 | 5 | 1613 | 1533 | 80 |
| 17 | 5 | 2 | 3 | 4.32 | 1624 | 1523 | 101 |
| 18 | 5 | 2.5 | 3 | 3.8 | 1617 | 1496 | 121 |

The above example 1–18 illustrates the sensitivity of the fiber in accordance to the invention to various structural parameter changes. In particular, it can be seen in Examples 1–4 that by changing the hole diameter from 1 to 15 microns, the single polarization wavelength band may be driven to shorter wavelengths. Examples 14–18 dramatically illustrates how the core delta, Δ1, may be used to broaden the width of the single polarization band. The remaining examples show how the average core diameter, d avg, and aspect ratio, AR1, may be used to influence the single polarization bandwidth and the relative location of that band.

The center core 34 is preferably surrounded by an annular region 32 having a different composition than the center core; preferably being of a refractive index less than the core. Accordingly, the annular region 32 is preferably down-doped relative to pure silica, and is therefore most preferably manufactured from fluorine-doped silica. Annular region 32 preferably exhibits a delta %, Δ2, as shown in FIG. 5 of between about −0.0% and −0.7%; more preferably between about −0.2% and −0.6%; and most preferably about −0.4%. Generally, the glass in the annular region 32 is doped such that it is more viscous at draw temperatures than is the center core 34. The annular region 32 may also have a generally oval shape as illustrated by core/clad interface 36 of FIG. 3 or, more preferably, a generally circular shape as illustrated by dotted line 38.

In an embodiment having a circular shape, the annular region 32 preferably has an outer diameter, D, of between about 10 to 25 microns; more preferably between about 13—19 microns; and in one embodiment about 16.5 microns. Optionally, the annular region 32 may have a generally elongated shape, such as elliptical. In this case, the average dimension D avg={A'+B'}/2 is about twice that of the central core 34, for example, between about 6 to 16 microns, and the second aspect ratio, AR2, defined as A'/B', is between about 1.5 and 8.

In addition to the elliptical central core, at least one air hole is formed on opposite sides of the core 34. The holes 24, 26 are preferably formed, at least in a part, in the annular region 32 of the fiber 20. The holes 24, 26 are preferably air holes and extend along the entire longitudinal length of the fiber 20, and are preferably of substantially constant dimension along the fiber length. The holes 24, 26 are preferably positioned on diametrically opposite sides of the center core 34 and may be entirely or only partially formed in the annular region 32. For example, the holes 24, 26 may be entirely included within annular region 32 or the holes 24, 26 may partially extend into the cladding 30 as shown in fiber 120 of FIG. 7. The holes are positioned adjacent to, and aligned with, the minimum dimension B of the center core 34 and in very close proximity thereto (for example, having a hole edge located within 3 microns from the center core 34). Regarding the alignment, the air holes are positioned such that a line 28 (FIG. 6) passing through the center of the holes 24, 26 is substantially aligned with the minimum dimension (B). The holes are preferably circular, but may optionally be of other shapes and may be of equal or non-equal size, and preferably have a maximum dimension, such as diameter d (FIG. 6) of between about 1 to 15 microns; more preferably between about 5 and 11 microns. Although only one hole is shown on each side, multiple holes along each side may also work to cause the elliptical shape and provide single polarization within an operating wavelength band.

A fiber cladding 30 preferably surrounds, and is in contact with, the annular region 32. The cladding 30 preferably has a conventional outer diameter of about 125 microns and has a composition of preferably substantially pure silica. Optionally, cladding 30 may include other suitable dopants, such as fluorine, and the outer diameter may be reduced, if size constraints so dictate.

General representations of the relative refractive index profiles of the single polarization fiber 20 are illustrated in FIGS. 4 and 5 along the X—X and Y—Y axes, respectively. The plots show relative refractive index percent (Delta %) charted versus the fiber radius (in microns) and distinctly illustrates the differences in the profiles along both such axes. In particular, the plots illustrate the maximum relative refractive index of the central core 34, Δ1, the relative refractive index of the hole 26 (shown truncated—because of its depth), and the maximum relative refractive index of the annular segment 32, Δ2. The relative refractive index of air is about $n_{air}$, =1.0, as such, the Delta % is very negative (estimated about −54%). The dotted portion 38 of the profile reflects a fiber 20 wherein the portion 32 has a round shape (illustrated by dotted line 38—See FIG. 3). Thus, it should be readily recognized that the refractive index profiles along each axis are very different.

Figure 7:
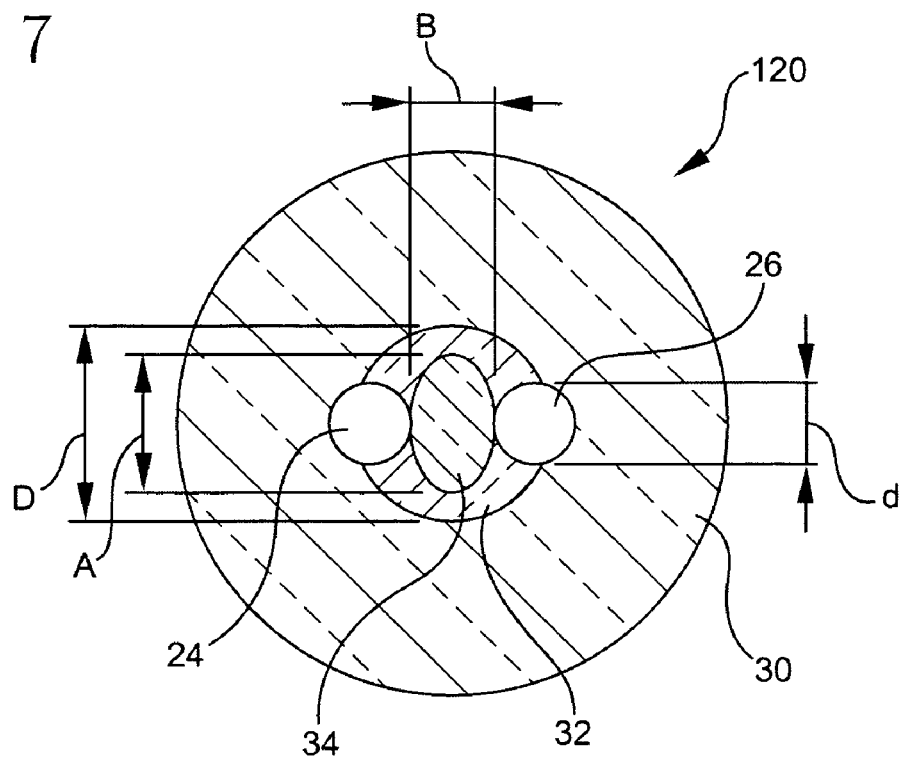
FIG. 7 is a cross-sectional view of a second embodiment of the single polarization optical fiber in accordance with embodiments of the present invention.

Another embodiment of the single polarization fiber 120 is shown in FIG. 7. The fiber 120 includes an elliptically-shaped central core 34, circular cross section air holes 24, 26 positioned on either side of the central core alongside the short dimension of the elliptical core, an annular region 32, and a cladding region 30. In this embodiment, the holes 24, 26 are formed partially in the region 32 and partially in the cladding 30. The annular region 32 is fluorine-doped sufficiently to provide a delta % of about −0.4%. Cladding 30 is manufactured from preferably pure silica. The ranges for d (diameter of the holes), maximum and minimum dimensions, A and B, and diameter of the annular region, D, given above are equally suitable for this embodiment.

Figure 8:
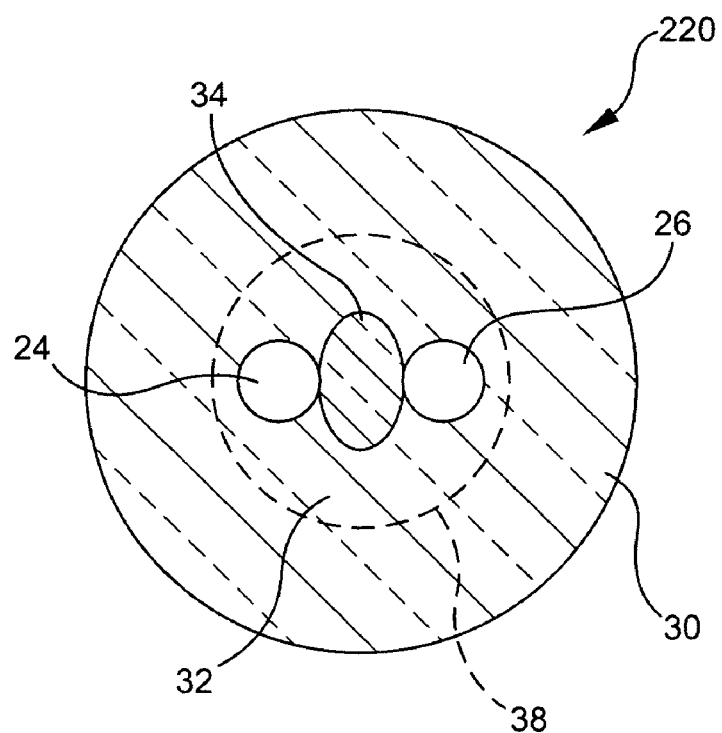
FIG. 8 is a cross-sectional view of a third embodiment of the single polarization optical fiber in accordance with embodiments of the present invention.

Still another embodiment of the single polarization fiber 220 is shown in FIG. 8. In this embodiment, the fiber 220 includes elliptically-shaped central core 34, circular air holes 24, 26 positioned on either side of the central core alongside the short dimension of the elliptical core, and a cladding region 30. In this embodiment, the holes 24, 26 are formed in the annular region 32, but the region is manufactured from the same material as the cladding 30, which is preferably pure silica. The dotted line 38 indicates an interface between the core and cladding regions which is positioned at a radius larger than the outermost portion of the holes 24, 26. In this embodiment of fiber 220, the core delta, Δ1%, is preferably about 1.6%.

The single polarization fibers 20, 120, 220 according to embodiments of the present invention each exhibit optical properties enabling single polarization (transmission of one, and only one, polarization mode) within a designed SPB 48 (See FIG. 9). Preferably, the SPB 48 of the single polarization fiber according to the invention is designed to be located between about 800–1600 nm. Most preferably, the fiber's SPB 48 will be designed such that it coincides with 980, 1310 or 1550 nm such that it is readily useable with optical components operating at 980, 1310 or 1550 nm. In particular, it is preferred that the center wavelength of the SPB substantially coincides (within about +/−20 nm) with the center wavelength of the operating wavelength of the component. Further, the fibers 20, 120, 220 in accordance with the invention preferably exhibit an extinction ratio at 978 nm of equal to or greater than 15 dB; and more preferably equal to or greater than 20 dB within the SPB 48.

EXPERIMENTAL EXAMPLE 1

A first representative single polarization fiber according to the invention was manufactured having the cross-sectional structure shown in FIG. 7. The fiber 120 has a central core 34 having an average diameter, d avg, of about 5.33 microns, a maximum dimension, A, of about 7.75 microns, a minimum dimension, B, of about 2.9 microns—resulting in a first aspect ratio A/B equal to about 2.7, a central core delta, Δ1, of 1.1%, and an alpha profile having an α of about 2. The holes 24, 26 were partially included in the annular region 32 and partially included in the cladding 31. Holes 24, 26 had an average diameter of about 8.3 microns. The annular region 32 was fluorine-doped thereby being depressed relative to the pure silica cladding 30. The relative refractive index, Δ2, of the annular region 32 was −0.4% and the outer diameter D of the annular region 32 was about 16 microns. The holes 24, 26, in this embodiment, substantially abutted the sides of the central core 34. The single polarization fiber 120, for example, was tested and exhibited an extinction ratio, ER, of about 38.6 dB over a length of 1.51 m at a wavelength of 978 nm. The ER was about 15 in the SPB 48. The fiber's beat length was found to be 4.21 mm. Attenuation was measured to be 0.027 dB/m at 978 nm on a length of 1.45 m.

EXPERIMENTAL EXAMPLE 2 and 3

Other portions of the same fiber along the length thereof (and spaced from the length of Exp. Ex. 1) were also tested in Exp. Ex. 2 and 3 giving slightly different performance results. It was determined by the inventors that this variation in properties along the length of the fiber was due predominantly to process control variations in the prototype fiber which in a production fiber would be in much better control.

EXPERIMENTAL EXAMPLE 4

A further experimental sample is shown in Table 2 as Exp. Ex. 4. In this example, the core delta, Δ1, was 2.0% and Δ2, was −0.4%. In this example, the Aspect Ratio, AR1, was about 3.2 having an average core diameter, d avg, of about 4 microns ({A+B}/2). Average hole diameters and other fiber parameters were similar to example 1. As is demonstrated by this example, raising the relative refractive index of the central core to 2.0% has increased the Single Polarization (SP) bandwidth to 42 nm as compared to 1.1%.

The optical properties of the single polarization fiber described above and additional experimental fibers are given of are given in Table 2.

TABLE 2

Optical Properties For Experimental Example Fibers

| Example # | Exp. Ex. 1 | Exp. Ex. 2 | Exp. Ex. 3 | Exp. Ex. 4 |
| --- | --- | --- | --- | --- |
| Extinction Ratio ER (dB) in the SPB | 15 | 22 | 20 | >15 |
| Beat Length $L_B$ (mm) | 4.21 | 3.89 | 2.79 | 1.11 |
| Attenuation (dB/m) | 0.027 | — | — | 1.76 |
| P1 Cutoffλ1 (nm) | 1157 | 1147 | 1164 | 972 |
| P2 Cutoffλ2 (nm) | 1183 | 1175 | 1097 | 1014 |
| SP Band Bandwidth (nm) | 26 | 28 | 33 | 42 |

FIG. 9 is a plot illustrating the Single Polarization Bandwidth (SPB) 48 for the Experimental Example 1 fiber of FIG. 7 by showing traces of transmission power (dB) versus wavelength (nm) for the different polarizations 45, 50 of the fiber 120. In particular, first 45 and second 50 polarizations were measured and plotted as a function of wavelength.

The extinction ratio at 978 nm was generated by passing a light signal from a 978 nm single wavelength pump laser with a bandwidth of 0.5 nm through a short length of the fiber and then measuring the transmitted power at a wavelength of 978 nm. Likewise, the ER may be measure in the same way within the SPB. The transmission power was measured along the two polarizations at the fiber's output end, while at the input end, a polarizer is aligned with each one of the birefringent axes, in turn. The extinction ratio, ER, was determined by using the equation:

$$ER = 10 \log p1/p2$$

where
p2 is the power in the second polarization, and
p1 is the power in the first polarization.

Beat length $L_B$ was also measured using a wavelength scanning technique by determining the modulation period, $\Delta\lambda$, in the source's spectrum and the fiber's length L. Two polarizers were inserted before and after the fiber. The beat length $L_B$ (mm) is calculated according to the equation:

$$L_B = \{\Delta\lambda L\}/\lambda$$

where $\lambda$ is the center wavelength (nm) of the source. In this measurement, a broadband ASE source is employed and the modulation period is obtained by performing a Fourier transform. The wavelength of the ASE source was 940–1020 nm and the center wavelength was 980 run. The measured beat length was 4.21 mm.

Likewise, the cutoff wavelength of the first polarization, $\lambda 1$, cutoff wavelength of the second polarization, $\lambda 2$, and Single Polarization Bandwidth (difference between the cutoff wavelengths of the two polarization modes) are determined. For each measurement a non-polarized white light source is used which has a flat spectrum from 300–2000 nm. A polarizer is then inserted at the light launching end and set to the two polarization axes determined from the measurement of the extinction ratio to perform the cutoff testing for each polarization.

The attenuation of the single polarization fiber is measured by measuring the power p1 on a first length (approx. 3 m) of fiber and then cutting the fiber into a shorter length (approx. 1 m) and measuring the power p2. The attenuation is then calculated as:

$$Attn = [10 \log p1 - 10 \log p2]/L$$

where L is the length removed. The attenuation is measured at 978 nm

Figure 10:
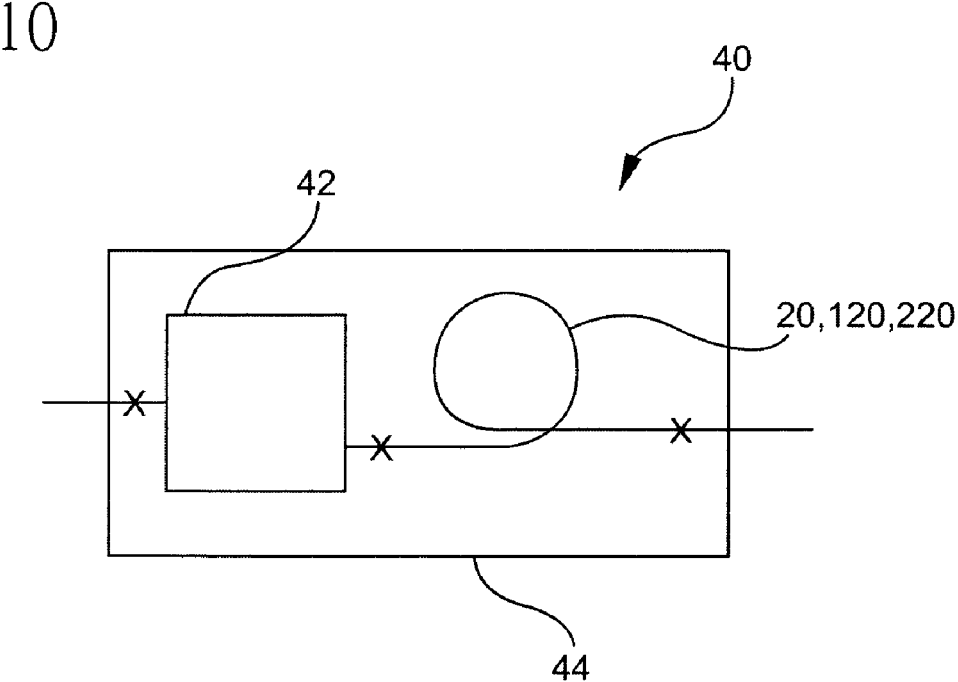
FIGS. 10–12 are schematic views of systems including a single polarization optical fiber in accordance with embodiments of the present invention being optically coupled to an optical component.

FIG. 10 illustrates one system 40 employing the single polarization fiber 20, 120, 220 according to the embodiments of the single polarization fiber described herein. The system 40 includes an optical device 42, such as a laser, gyroscope, sensor, modulator, beam splitter, polarization multiplexer, or the like having the fiber 20, 120, 220 in accordance with the invention included therein or attached thereto. The fiber 20, 120, 220 and the optical component 42 may be included in a further housing 44 and comprise subcomponents therein.

Figure 11:
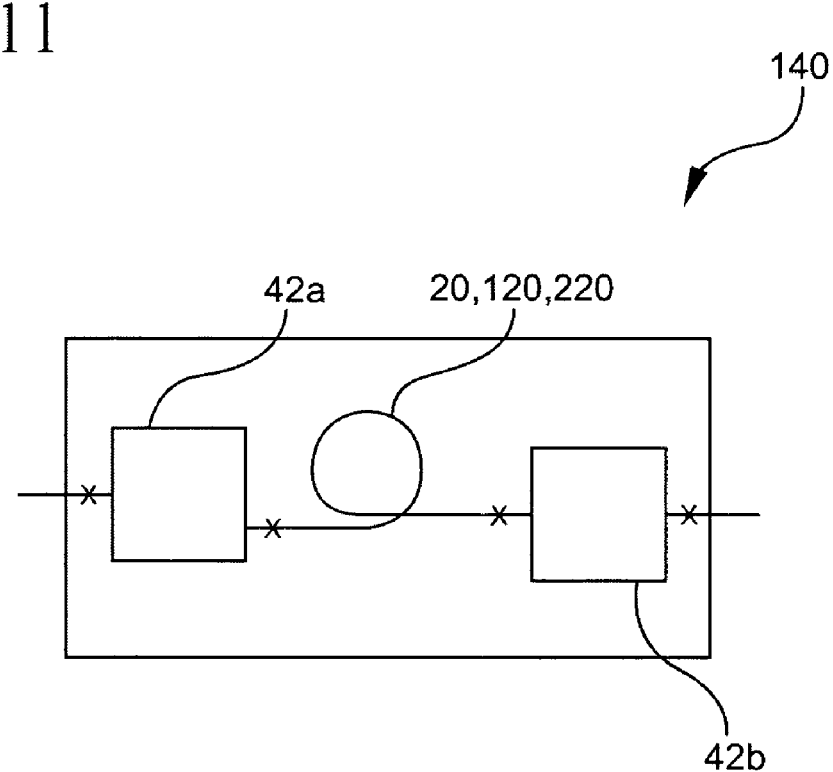

FIG. 11 illustrates a system 140 wherein the fiber 20, 120, 220 in accordance with embodiments of the invention is attached between optical components 42a, 42b and wherein the fiber and the optical components are optionally contained within a housing 144.

Figure 12:
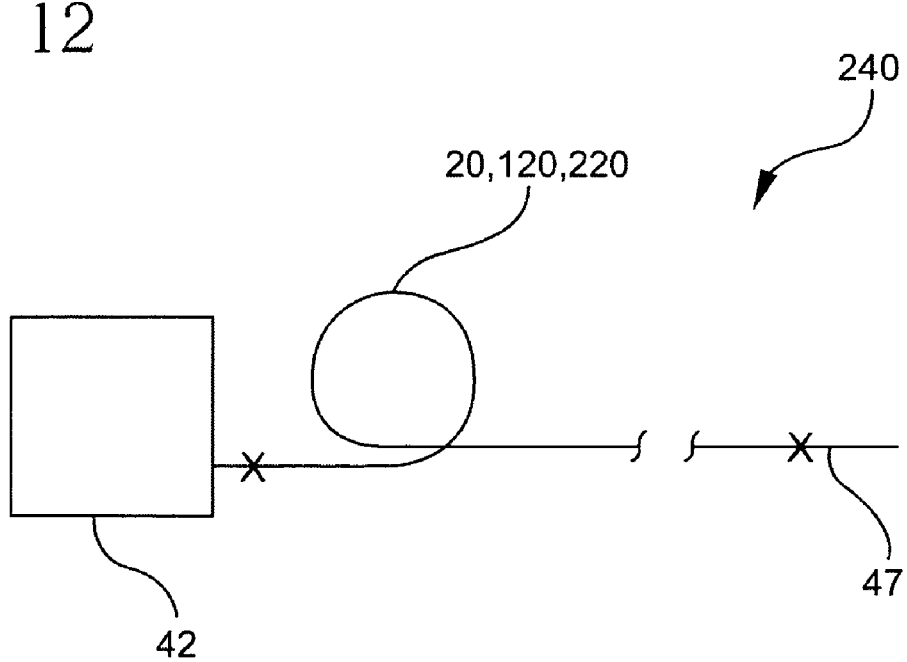

FIG. 12 illustrates a system 240 wherein the fiber 20, 120, 220 in accordance with embodiments of the invention is attached to an optical component 42 and wherein the fiber is optically coupled to another type of fiber 47.

Figure 13:
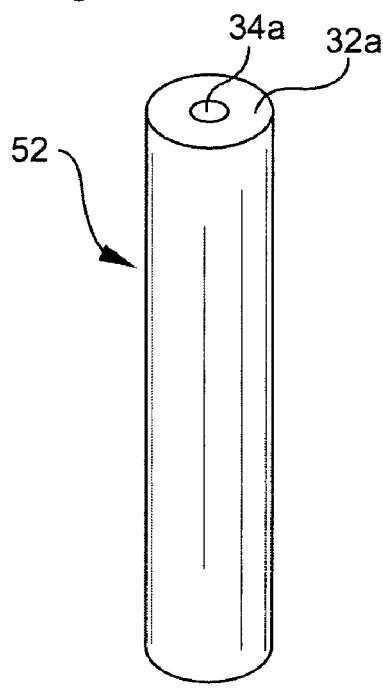
FIGS. 13 and 14 are schematic side isometric views of a core cane used to manufacture the single polarization fiber in accordance with the invention.

The fibers 20, 120, 220 described herein are formed utilizing the following method of manufacturing. First, a core cane 52, as shown in FIG. 13, is provided having the proper germania-doped core delta, $\Delta 1$, in the central core 34a of between about 0.5–2.5%, and an annular region 32a doped with fluorine surrounding the core 34a having a delta, $\Delta 2$, of between about −0.0 to −0.75%. The core cane 52 was preferably 1 meter long and about 42 mm in diameter.

Figure 14:
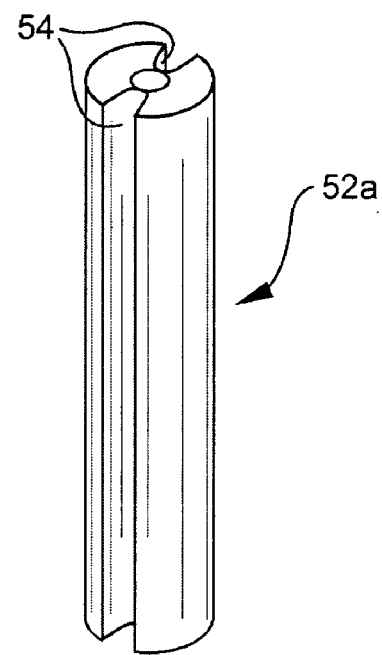
Figure 15:
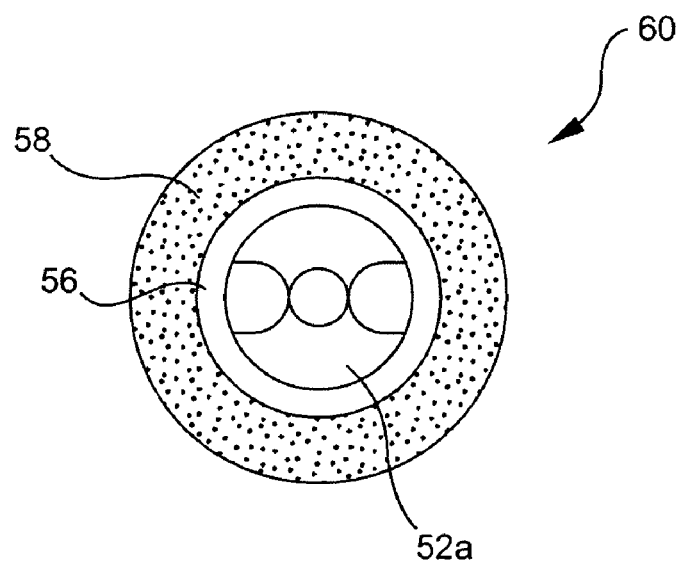
FIG. 15 is an end view of a preform subassembly used to manufacture the single polarization fiber in accordance with the invention.

Grooves 54 are then ground into the diametrically opposite longitudinal sides of the cane 52 to a width of about 13 mm and a depth of about 7 mm, as illustrated in FIG. 14, thereby forming grooved cane 52a. The groove depth should be such that its bottom substantially abuts the central core 34a. The ground core cane 52a is then etched in HF for about 30 minutes to remove grinding debris. The ground and etched cane 52a is then inserted into a 1 meter long silica tube 56 overclad with about 800 grams of silica soot 58 as shown in FIG. 15 to form a preform subassembly 60. Overcladding 58 may be produced by an Outside Vapor Deposition (OVD) method, for example.

Figure 16:
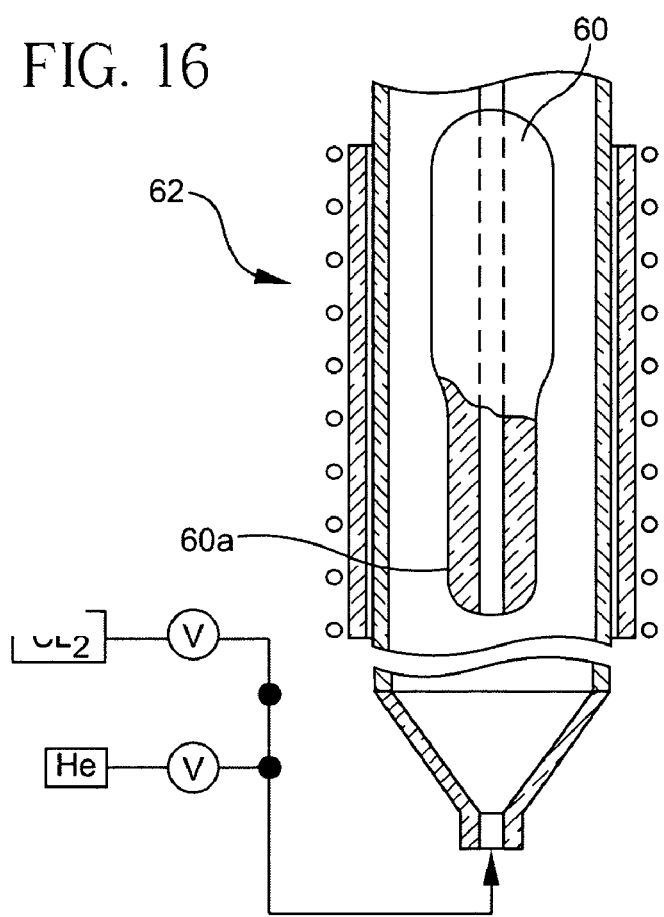
FIG. 16 is a partially cross-sectioned side view of the preform subassembly mounted in a consolidation furnace.
Figure 17:
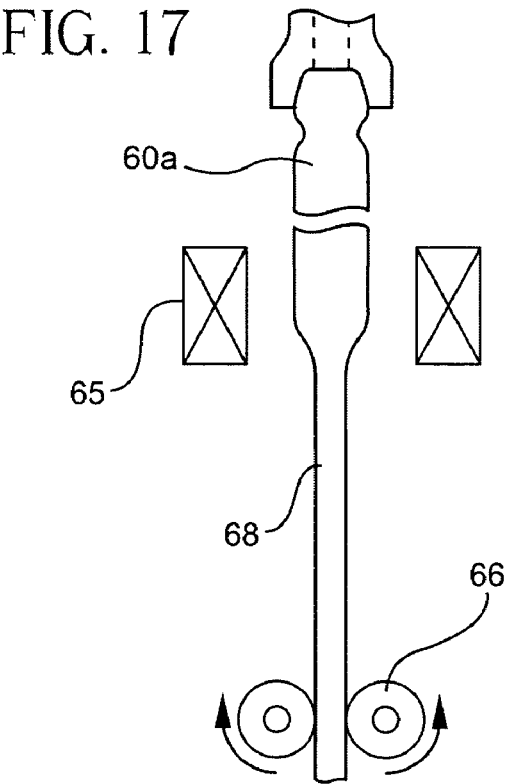
FIG. 17 is a partial schematic side view illustrating a process/apparatus for redrawing the preform into a core cane.

The preform subassembly 60 of FIG. 15 is then consolidated in accordance with a conventional consolidation process as shown in FIG. 16 by first drying in a consolidation furnace 62 in an atmosphere of $Cl_2$, and then consolidating in the furnace in a He-containing atmosphere to produce a consolidated preform 60a. The consolidated preform 60a is then inserted into a redraw tower 64 as shown in FIG. 17. Heat is applied to preform 60a by heating element 65 and it is drawn down by tension applying wheels 66 into an approximately 7 mm diameter core cane 68. While the redraw process (drawing to a smaller diameter core cane from the preform) is occurring, a positive pressure is applied to the holes 24, 26 sufficient to keep them from closing. The pressure may be sufficient to cause the central core to elongate slightly. The pressure used is a function of the draw temperature, glass viscosity, and draw speed among other factors.

Figure 18:
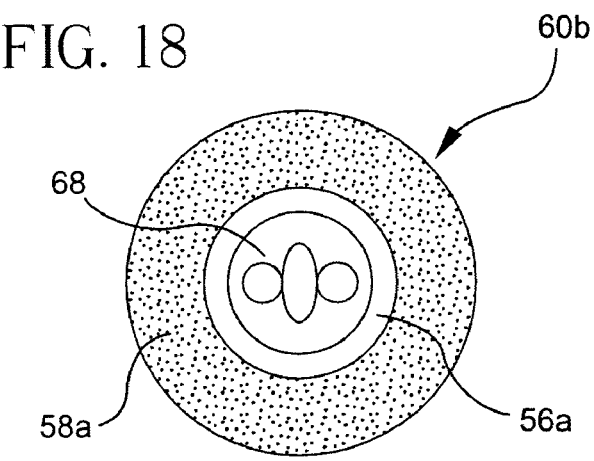
FIG. 18 is an end view of another preform subassembly used to manufacture the single polarization fiber in accordance with the invention.
Figure 19:
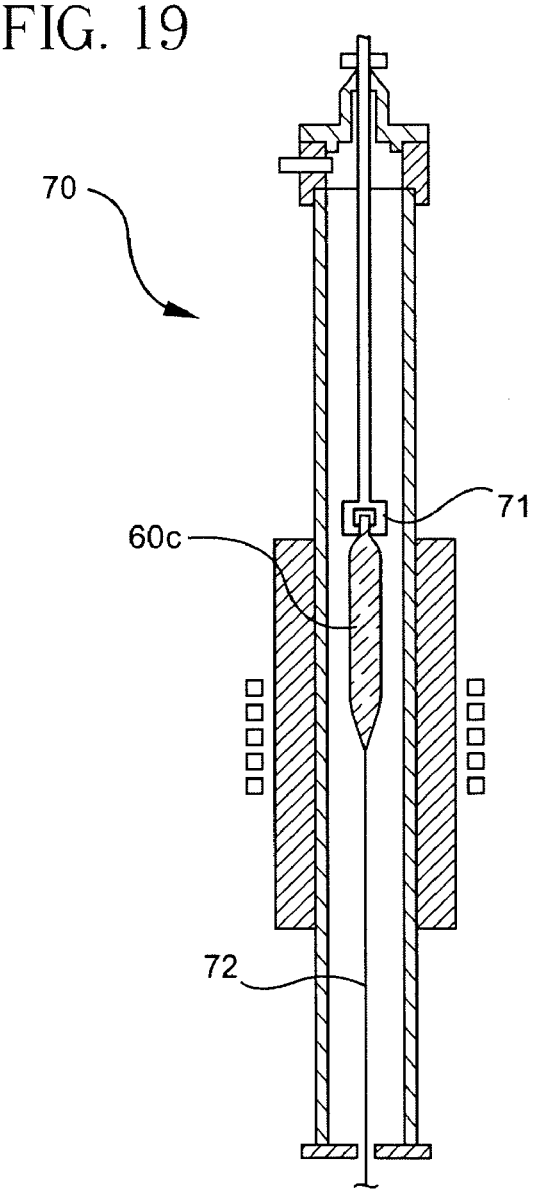
FIG. 19 is a partial cross-sectional side view illustrating a process/apparatus for drawing optical fiber in accordance with embodiments the present invention.

This cane 68, now having an elliptically shaped central core and air holes, is again inserted into a 1 meter long silica tube 56a overclad with about 1000 grams of silica soot 58a as shown in FIG. 18 to form preform subassembly 60b. This preform subassembly is consolidated in the same manner as heretofore described. The consolidated blank 60c is then suspended from a handle 71 in a draw furnace 70 as shown in FIG. 19 and a fiber 72 is drawn therefrom. During draw, a small positive pressure is applied to the holes to cause the core to become elliptically shaped. As should be recognized, the elongation of the core may occur in the redraw step, the draw step, or combinations thereof to achieve the desired aspect ratio of the central core. In either case, a positive pressure is applied to the holes in the preform (and fiber) to cause the elongation to occur.

It will be apparent to those skilled in the art that variations and modifications can be made to the present invention without departing from the scope of the invention. Thus, it is intended that the present invention cover the modifications and variations of this invention provided they come within the scope of the appended claims and their equivalents.

What is claimed is:

1. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, wherein the central core includes germania-doped silica and is surrounded by an annular region of fluorine-doped silica wherein a first aspect ratio, defined as A/B, is between about 1.5 to 8.

2. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, further comprising a first aspect ratio, defined as A/B, between 2 and 5.

3. The optical fiber of claim 2 wherein the air holes are positioned such that a line passing through the center of the holes is substantially aligned with the minimum dimension (B).

4. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, optical fiber having attenuation of less than 0.030 dB/m at 978 nm.

5. A system including the single polarization fiber of claim 2 wherein the system includes an optical component optically coupled to the single polarization fiber.

6. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, wherein the central core has a delta % of between about 0.5% and 2.5%.

7. The optical fiber of claim 6 wherein the central core has a delta % of between about 0.5% and 2.5% and a fluorine doped region surrounding the central core has a delta of between about −0.0% and −0.75%.

8. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, wherein a fluorine doped region surrounding the central core has a delta of between about −0.0% and −0.75%.

9. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, further comprising an annular region (32) of fluorine-doped silica surrounding the central core.

10. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, wherein the core region includes a region of fluorine-doped silica surrounding the central core and wherein the central core includes germania-doped silica.

11. An optical fiber, comprising:
a central core having a maximum dimension (A) greater than a minimum dimension (B) and a substantially elliptical shape, the fiber having at least one air hole positioned each opposite side of the central core wherein the optical fiber supports a single polarization mode within a operating wavelength range, further comprising an annular segment surrounding the central core, the annular segment having a second aspect ratio, defined as A'/B', which is greater than about 1.5.

* * * * *